United States Patent
Vian

[19]

[11] Patent Number: 6,114,976
[45] Date of Patent: Sep. 5, 2000

[54] VEHICLE EMERGENCY WARNING AND CONTROL SYSTEM

[75] Inventor: John Lyle Vian, Renton, Wash.

[73] Assignee: The Boeing Company, Seattle, Wash.

[21] Appl. No.: 09/245,957

[22] Filed: Feb. 5, 1999

[51] Int. Cl.$^7$ ................................................. G08B 21/00
[52] U.S. Cl. ........................... 340/945; 340/963; 340/903; 701/36; 244/122 A
[58] Field of Search ..................................... 340/945, 963, 340/903; 701/36, 1, 59, 27, 41; 395/22, 23, 905, 906, 21, 24; 703/3; 244/122 A, 141, 122 R; 706/23, 905

[56] References Cited

U.S. PATENT DOCUMENTS

| | | | |
|---|---|---|---|
| 4,673,147 | 6/1987 | Solomonides | 240/122 A |
| 4,787,576 | 11/1988 | McGrady et al. | 244/122 R |
| 5,295,231 | 3/1994 | Ogino | 395/77 |
| 5,309,379 | 5/1994 | Rawlings et al. | 703/8 |
| 5,402,521 | 3/1995 | Niida et al. | 395/22 |
| 5,541,590 | 7/1996 | Nishio | 340/903 |
| 5,586,220 | 12/1996 | Spiker | 395/22 |
| 5,684,699 | 11/1997 | Sugiyama | 701/41 |
| 5,710,559 | 1/1998 | Krogmann | 340/963 |
| 5,983,161 | 11/1999 | Lemelson et al. | 701/301 |

OTHER PUBLICATIONS

Vian, J.L. and Visnevski, N.A., "Neural Networks for Nonlinear Control Distribution," Third International Federation of Automatic Control Symposium on Intelligent Components and Instruments for Control Applications, Jun. 9–11, 1997, Annecy, France.

Breen, T., "Why the 2000 Foot Minimum Ejection Altitude," *The Combat Edge*, Mar. 1995, pp. 26–31.

*Primary Examiner*—Benjamin C. Lee
*Attorney, Agent, or Firm*—Christensen O'Connor Johnson & Kindness PLLC

[57] ABSTRACT

An automatic vehicle warning and control program is provided for determining if safety enhancing actions are appropriate. The on-line determination of an action that results in a preferred outcome (e.g., aircraft ejection) is made using a neural network controller. The neural network controller is trained off-line using appropriate preferred outcome data obtained via computer simulation or experimentation. Appropriate actions are established for all conceivable sets of vehicle conditions. On-line, the neural network controller uses actual sensed vehicle conditions to determine the appropriate action. Various actions can be performed based on the preferred outcome determination. Appropriate actions can include commanding audible and visual warnings, guidance cues, automatic vehicle control, and aircraft automatic ejection.

22 Claims, 7 Drawing Sheets

VEHICLE EMERGENCY WARNING AND CONTROL SYSTEM

FIELD OF THE INVENTION

This invention relates generally to vehicle warning systems and, more particularly, to methods and systems for determining when vehicle emergency action based on current conditions should take place, and performing the appropriate action, for example warning enunciation, automatic control of the vehicle, or emergency egress of the vehicle occupants.

BACKGROUND OF THE INVENTION

Ejection seats for aircraft are known in the art. Minimum altitudes are established for controlled aircraft ejections (e.g., 2,000 feet). Technology has dramatically improved aircraft ejection seat performance. However, human factors continue to adversely affect aircraft ejection safety. Several human factors affect safe ejection from an aircraft, for example, reaction times, distractions, task management, and altitude assessment. Thus, a method for minimizing the effect of human factors on aircraft ejection is desirable. The present invention is directed to achieving this result. More specifically, the present invention is directed to providing a method and system for determining if ejection of an occupant from a vehicle is appropriate, and if so, performing automatic ejection and/or providing a warning that ejection is appropriate, all without operator intervention.

SUMMARY OF THE INVENTION

The present invention is directed to a method and system for determining whether occupant emergency egress based on current conditions of a vehicle is acceptable and warranted. A neural network is created off-line. The neural network is implemented in a controller that is used on-line to make a vehicle status determination.

In accordance with other aspects of this invention, an action is performed based on the vehicle status determination, which is either that: the aircraft can be saved; ejection is acceptable; or ejection is not acceptable. If ejection is acceptable, the action performed can be the automatic ejection of the occupant from the aircraft. Alternatively, the action can be a warning. Warnings or instructions can also serve as the function performed when the aircraft can be saved or when ejection is not acceptable.

In accordance with further aspects of the present invention, the off-line process of creating a neural network includes: obtaining a set of conditions; performing an ejection seat simulation for the set of conditions; making a preferred outcome determination; and storing the preferred outcome determination. This process is repeated for all conceivable sets of conditions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

While the present invention is ideally suited for an aircraft, and is described in the context of an aircraft, it will be appreciated that the invention can also be implemented in other types of vehicles, such as automobiles and space launch vehicles.

Figure 1:
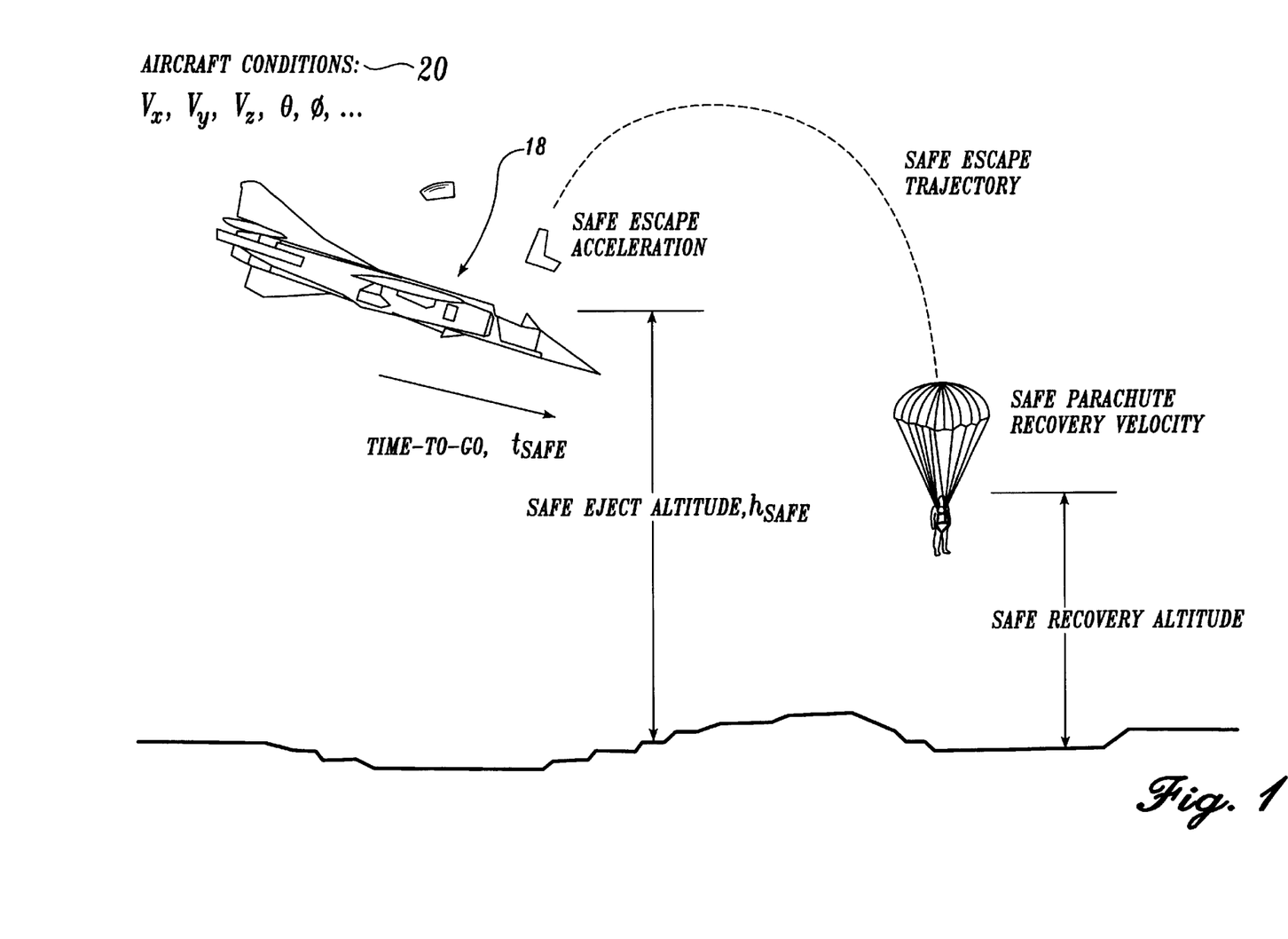
FIG. 1 is a pictorial representation of an aircraft ejection with a safe outcome.

FIG. 1 illustrates minimum conditions under which the ejection seat(s) of an aircraft can be operated to safely eject the occupants of an aircraft 18. The input parameters, are the aircraft conditions 20 which include factors such as: altitude, pitch, roll, flight path angle, angular rates, and velocity of the aircraft. Based on these conditions, a determination is made as to whether ejection from the aircraft is safe.

Figure 2:
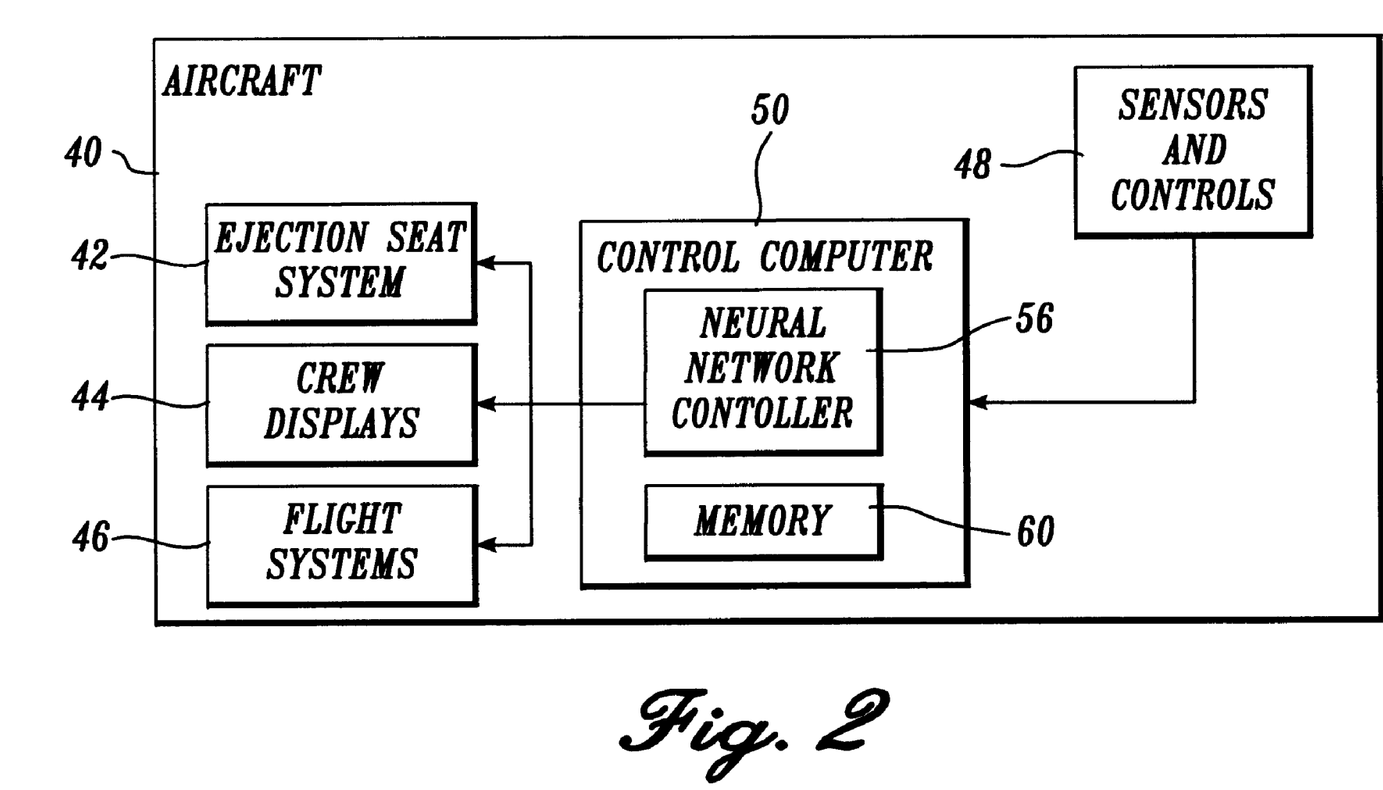
FIG. 2 is a block diagram of an aircraft with a control computer for controlling aircraft systems according to the present invention.

FIG. 2 illustrates in block form the components of a neurocomputing control system formed in accordance with the present invention for an aircraft 40. The aircraft 40 includes an ejection seat system 42, crew displays 44, flight systems 46, sensors and controls 48 for sensing ejection seat system and aircraft operation and receiving control commands, and a control computer 50 for determining desired vehicle system actions and generating appropriate control signals. The control computer 50 includes a neural network controller 56 and memory 60. Prior to implementation of the neural network controller 56, the neural network controller 56 is trained off-line, using a simulation of the aircraft 40 and its ejection seat system 42 to acquire knowledge for actual controller operation. The type of neural network and training process used is described in more detail below with respect to FIGS. 3–4.

Figure 3:
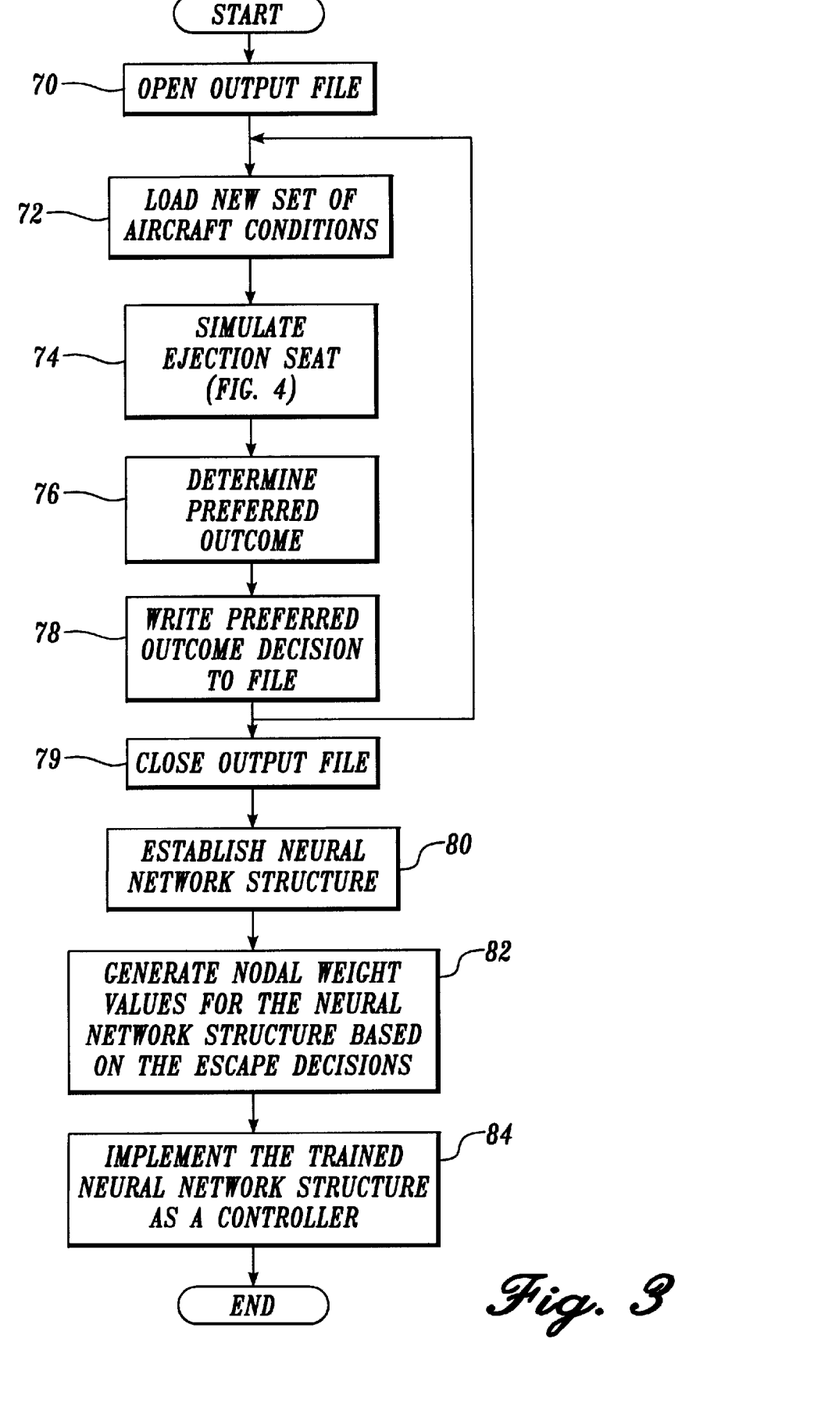
FIG. 3 is a flow diagram illustrating the logic of defining acceptable ejection seat trajectory conditions, and creating a neural network controller based on the acceptable trajectory ejection seat conditions to be used in the control computer of the present invention.

FIG. 3 illustrates the overall logic of the neural network controller 56 creation process. First, at block 70, an output file is opened. Next, at block 72, a new set of aircraft conditions is loaded. An ejection seat simulation is then performed at block 74. The ejection seat simulation is illustrated in detail in FIG. 4, and described later. Escape decision logic is then used to determine if an ejection results in the preferred outcome for the set of aircraft conditions loaded. See block 76. Next, at block 78, the preferred outcome determined in block 76 is written to the output file. As noted, the preferred outcome data is used to determine whether or not for the given set of aircraft conditions, an ejection is appropriate. The process of loading a new set of aircraft conditions 72, performing an ejection seat simulation 74, using the preferred outcome decision logic 76 to determine if ejection is appropriate, and writing the data to the output file 78 is repeated for sets of aircraft conditions that span its entire operating envelope. After sufficient sets of aircraft conditions have been considered, the output file is closed in block 79.

Figure 7:
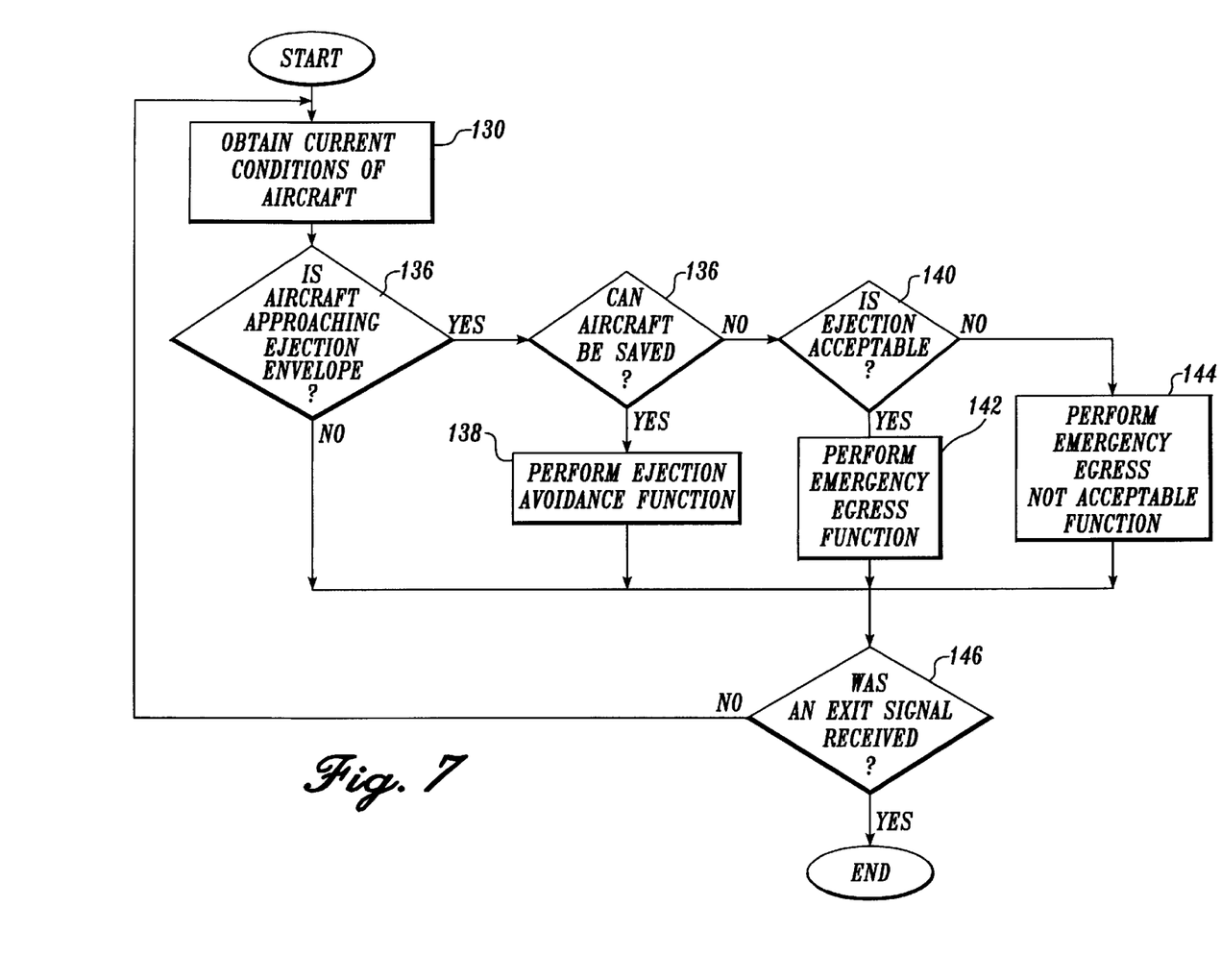
FIG. 7 is a flow diagram of the on-line logic used to determine if an automatic ejection should be performed.

Still referring to FIG. 3, at block 80, the neural network structure is established. The neural network structure includes inputs for all sensor and control signals (48 of FIG. 2), and outputs for all the corresponding command signals that are supplied to the ejection seat, crew displays, or flight systems (42, 44, and 46 of FIG. 2, respectively). As shown in FIGS. 5B and 5C and described more fully below, the neural network structure used in the present invention is either a unified or decoupled multi-layer perceptron artificial neural network. Next at block 82, the neural network structure teaching algorithm generates nodal weight values for the established neural network structure based on preferred outcome data determined in block 76. Back-propagation algorithms, node decoupled extended Kalman filter methods, or other neural network training techniques can be used to perform this nodal weight value generation. Proper setting of weight values increases the chance that all on-line generated data will be accurate. Once all the weight values have been generated for the neural network structure, the neural network is implemented as a controller in the control computer 50 of the aircraft 40, as shown in FIG. 2. See block 84. Neural network operation in a vehicle is shown in FIG. 7, and described later. The neural network can be implemented as an analog electric circuit, a computer program, an application specific integrated circuit or any other structure that allows the neural network to function properly. The control computer on which the neural network is implemented can be located at various areas within the aircraft, for example, in an avionics bay, in an ejection seat controller, in a vehicle management system, etc.

Figure 4:
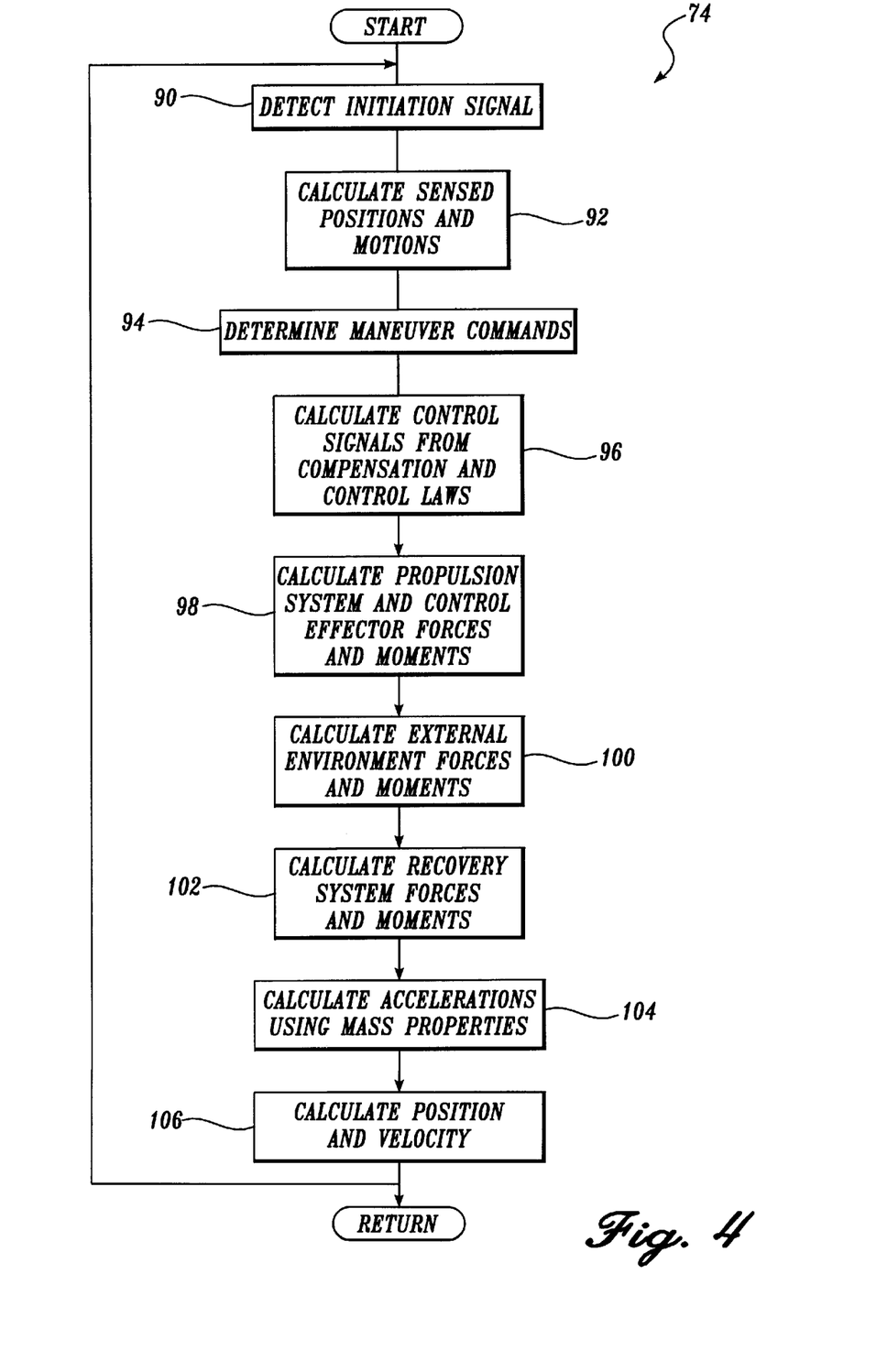
FIG. 4 is a flow diagram illustrating in detail the logic of simulating an emergency egress system consisting of an ejection seat.

FIG. 4 is an illustrative example of an emergency egress system simulation (block 74 of FIG. 3) consisting of an ejection seat. It will be appreciated that any high fidelity ejection seat simulation can be used. The logic of FIG. 4 moves from a start block to block 90 where an initiation signal is detected. Next, in block 92, sensed positions and motions are calculated. The types of positions and motions sensed are based on the nature of the aircraft (40 in FIG. 2). Examples of positions are seat location and roll, pitch, and yaw angles. Examples of motions include linear and angular velocity, and acceleration. Maneuver commands are then determined in block 94. Next, in block 96, control signals are calculated from compensation and control laws. The predefined compensation and control laws are determined by the nature of the ejection seat and the type of sensors employed. The logic then moves to block 98 where propulsion system and control effector forces and moments are calculated. Next, in block 100, external environment forces and moments are calculated. Then, in block 102, recovery system forces and moments are calculated. Next, in block 104, accelerations using mass properties are calculated. The logic then moves to block 106 where position and velocity are calculated. The logic of FIG. 4 of simulating an ejection seat is recursive and ends when the ejection is completely determined. Thus, the logic of blocks 90–106 is repeated until ejection is completely determined, at which point processing returns to FIG. 3. It will be appreciated that the ordering of the functions illustrated in FIG. 4 can be rearranged. For example, several of the functions, such as calculating external environment forces and moments 100, calculating recovery system forces and moments 102 can be performed at the same time as calculating propulsion system and control effector forces and moments 98.

Figure 5A:
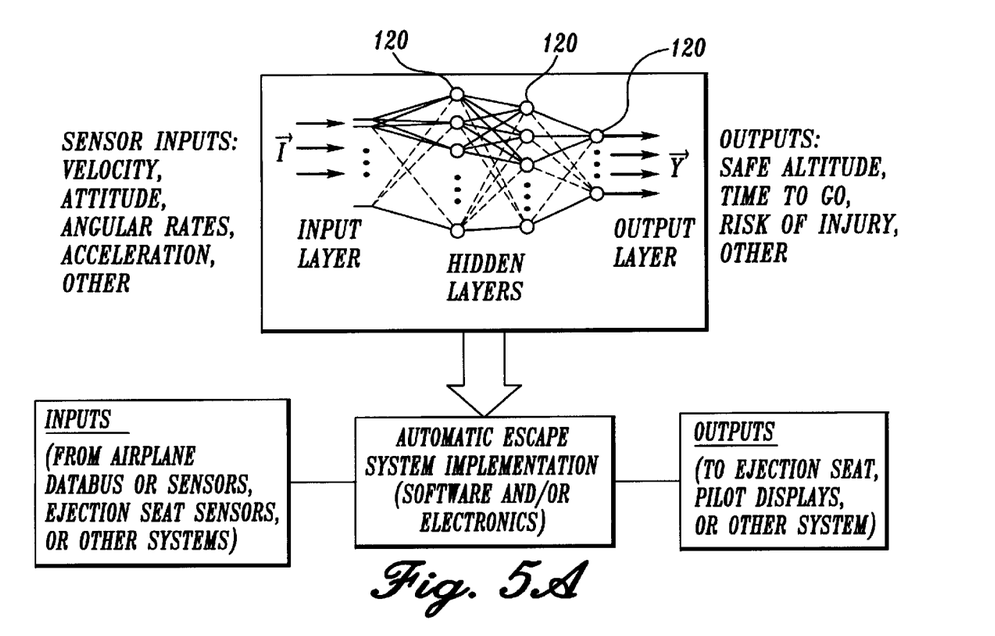
FIGS. 5A–5C are diagrams illustrating neural model network structures used in the present invention.
Figure 5B:
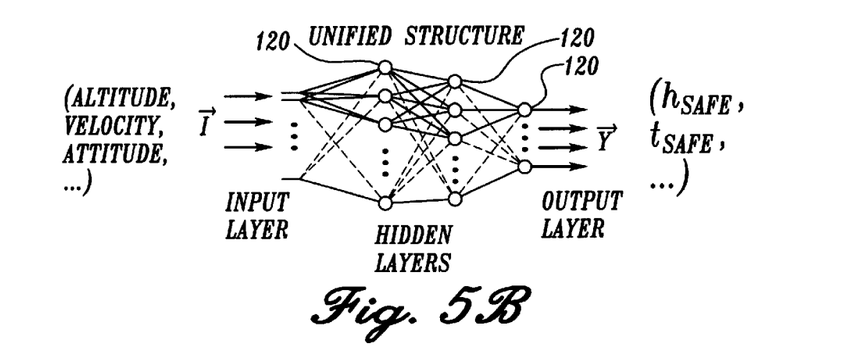
Figure 5C:
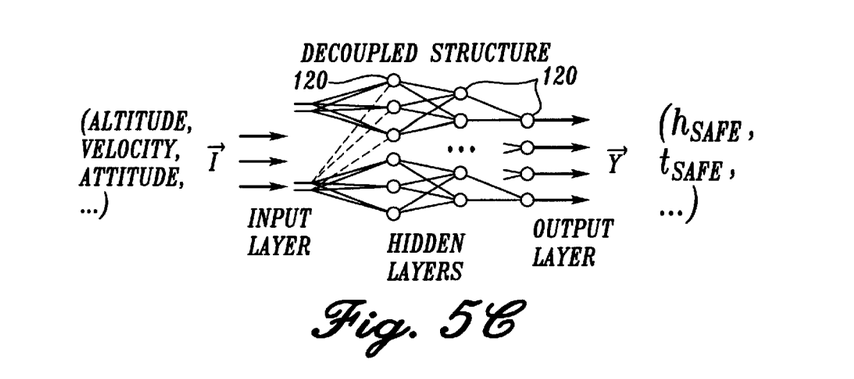

Referring to FIGS. 5A, 5B, and 5C, the neural network includes an input layer, one or more hidden layers, and an output layer. The elements that make up each layer of a neural network are referred to as neurons or nodes 120. Inputs are fed forward from the input layer to the hidden layers and then to the output layer. Recursive neural network structures may also have outputs from the layers fed back to preceding layers. The number of neurons 120 in each layer is determined before the network is finally trained. Typically, there is one input node for each input variable and one output node for each output. The hidden and output layers need not be completely connected (FIG. 5C). In a unified neural network (FIG. 5B), every input node is connected to every node in the following hidden layer and every node in a hidden layer is connected to every node in the following adjacent hidden layer or output layer, depending on the number of hidden layers. Each connection to a particular node is weighted.

Figure 6:
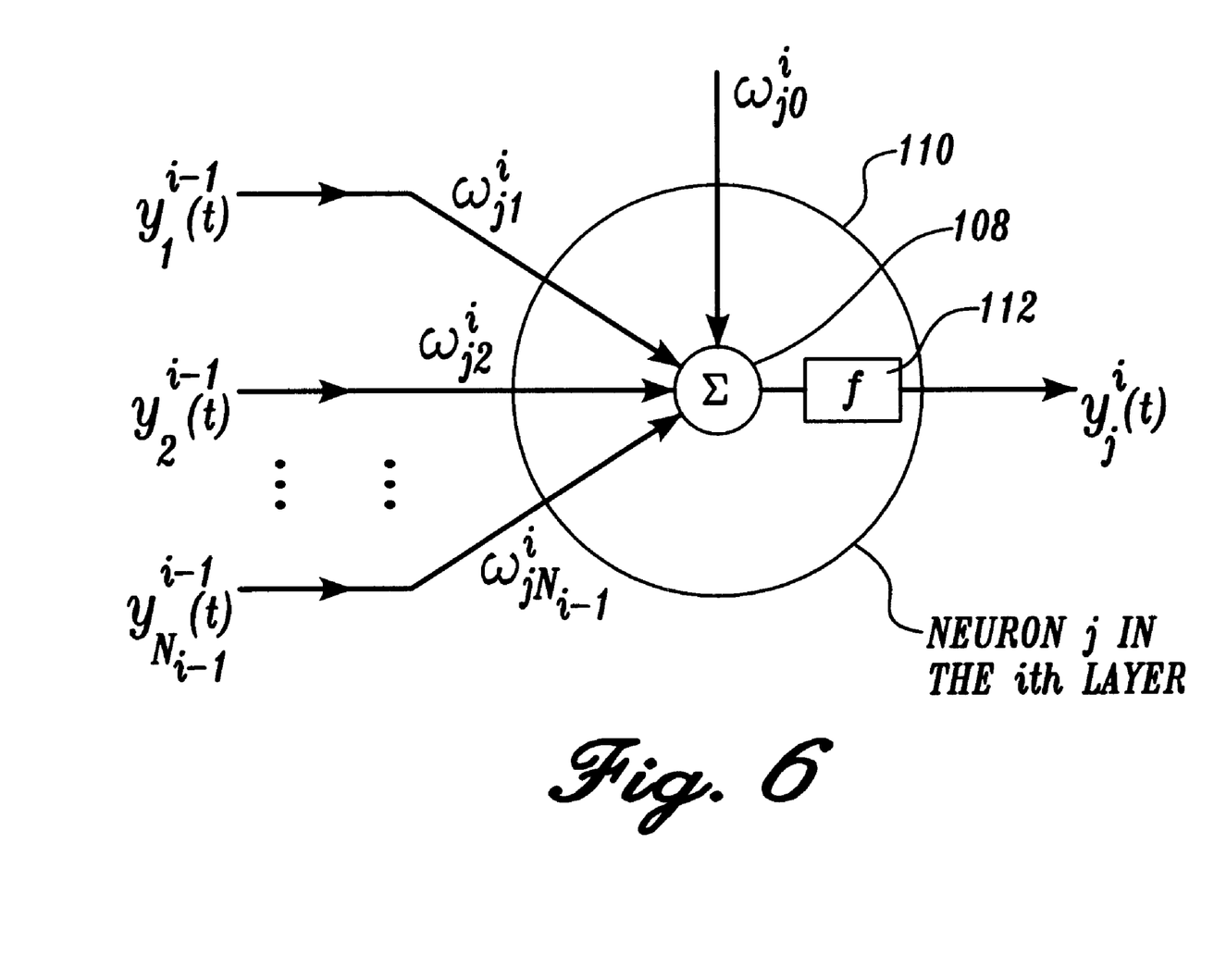
FIG. 6 is a diagram of a single neuron model of the present invention.

The number of nodes in the input and output layers is determined before the network is trained and corresponds to the number of sensor inputs (48 in FIG. 2) and output signals to the ejection seat, displays, or flight systems (42, 44, and 46 in FIG. 2 respectively). The number of neurons in the one or more hidden layers is selected based on accuracy achievable during training. FIG. 6 illustrates a single neuron model of a multi-layer perceptron neural network. Equation 1 describes the product of the summation 108 performed within the single neuron model 110 shown in FIG. 6:

$$y\_in_j^i(t) = \omega_{j,0}^i + \sum_{k=1}^{N_{i-1}} \omega_{j,k}^i \cdot y_k^{i-1}(t) \qquad (1)$$

where:

j=node number i=neural network layer number (0 to L)

k=weight value number t=index to an input pattern $N_i$=the number of neurons in the i-th layer of the network L=the number of layers in the network $\omega_{j,k}^i$=k-th weight of the j-th neuron in the i-th layer.

When k=0, weight value is the bias weight. $y_j^i(t)=f(y\_in_j^i(t))$ is the product of neuron 110 or nodal activation function 112. The nodal activation function 112 is a sigmoidal, radial basis, linear or other function. The nodal activation function sets a value produced by the neuron or activates or deactivates the neuron 110.

Derivatives used in the training process of the invention are based on expressions for dynamic derivatives of recurrent multi-layer perceptrons. Equation 2 which is used in the training process is written as:

$$\frac{\partial y_j^i(t)}{\partial \omega_{g,h}^l} = f'(y\_in_j^i(t)) \cdot \left\{ (1-\delta_{1,i}) \cdot \sum_{k=1}^{N_{i-1}} \omega_{j,k+1}^i \cdot \frac{\partial y_k^{i-1}(t)}{\partial \omega_{g,h}^l} + \delta_{1,i} \cdot \delta_{g,j} \cdot \left[ \sum_{k=1}^{N_{i-1}} \delta_{h,k+1} \cdot y_k^{i-1}(t) + \delta_{h,1} \right] \right\}, \quad 1 \leq i \qquad (2)$$

where:

$\delta_{i,j}$=the Kronecker delta.

If i=j, $\delta_{i,j}$=1 and otherwise, $\delta_{i,j}$=0. $f'(y\_in_j^i)$ is the derivative of the neuron's activation function 112 with respect to $y\_in_j^i$.

Equation 3 describes how the weight values are iteratively adjusted using derivatives, a learning rate parameter, and error values until the neural network outputs closely match the output values contained in the training data.

$$\omega\_\text{adjust}^i_{j,k} = \omega^i_{j,k} + n \frac{\partial y^i_j}{\partial \omega^i_{j,k}} (y^L_j - y\_\text{desired}^L_j) \quad (3)$$

where:

$$y^L_j - y\_\text{desired}^L_j = \text{error}$$

n=learning rate parameter.

At the beginning of neural network training, the connection weights in the network are set to initial values that may be randomized. The training data is then presented to the network one set at a time. In accordance with the present invention, the training data includes multiple sets of aircraft conditions (20 in FIG. 1) and the corresponding values of the command signals sent to the ejection seat, crew displays, and flight systems for a wide range of vehicle operations. The training process continues through all sets of the training data adjusting the weight values as necessary. Each set provides its own distinct neural network input and output. Accuracy between the values of training data is enhanced by applying random components to the training data as is appreciated by those of ordinary skill in the art of neural network design.

Once the neural network structure has been trained, i.e. all the weight values have been generated for the neural network structure, the neural network structure is implemented as a controller 56 in the control computer 50 of the aircraft 40, as shown in FIG. 2. The neural network structure can be implemented as an analog electric circuit, a computer program, an application specific integrated circuit or any other structure that allows the neural network structure to function properly. FIG. 7 illustrates the on-line process of determining whether an automatic aircraft ejection should be performed, using a fully trained neural network structure implemented as the controller 56. First, at block 130, current conditions of the aircraft are obtained. Next, at block 132, a test is made to determine if the aircraft is approaching the ejection envelope i.e., aircraft conditions envelope where an ejection is no longer permissible. See FIG. 1 for a pictorial representation of a safe ejection scenario. The determination is made based on the current and/or predicted conditions of the aircraft. The preferred outcome (i.e. escape)decision determined in FIG. 3 at block 76 that corresponds to the current conditions is produced. Further processing, is based on the retrieved decision. If the aircraft is approaching an acceptable ejection envelope, a test is made in decision block 136 to determine if the aircraft can be saved. If so, an ejection avoidance function is performed. See block 138. An example of an ejection avoidance function would be to provide a warning (either audio and/or visual) indicating that the state of the aircraft is such that the aircraft is about to enter or has entered into a state where ejection is unacceptable. Alternatively, instructions for eliminating or minimizing the unacceptable ejection state of the aircraft can be provided to the operator, or automatically to the flight systems.

If the aircraft cannot be saved, a test is made in decision block 140 to determine if ejection is acceptable. If so, an emergency egress function is performed, in block 142. The emergency egress function can be automatic ejection. Alternatively, the emergency egress function can be the generation of an audio and/or visual message advising ejection. Or, a combination of the above can be used, whereby an advisory message will be used if the operator is responsive, and automatic ejection will be performed if the operator is non-responsive.

If ejection is not acceptable, an emergency egress not safe function is performed, in block 144. For example, a message may be provided indicating steps for altering current aircraft state so that an acceptable ejection may be possible. If the aircraft is not approaching the ejection envelope, or the appropriate function has been performed based on whether the aircraft can be saved or whether ejection is acceptable, the logic moves to decision block 146 where a test is made to determine if an exit condition has been received. If so, processing ends. If not, the logic of blocks 130–144 is repeated until an exit signal is received.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for performing vehicle emergency and control functions comprising:
   (a) using an off-line process to create a neural network comprising a plurality of acceptable preferred outcome decisions based on the state of the vehicle;
   (b) implementing the neural network as a controller; and
   (c) using the controller during an on-line operation of the vehicle to make a preferred outcome determination based on current state of the vehicle.

2. The method of claim 1, further comprising performing a function based on the preferred outcome determination.

3. The method of claim 2, wherein an emergency egress function is performed if the preferred outcome determination is that emergency egress is acceptable.

4. The method of claim 3, wherein the emergency egress function is automatic ejection from the vehicle.

5. The method of claim 3, wherein the emergency egress function is the output of a warning.

6. The method of claim 2, wherein an emergency egress not acceptable function is performed if the preferred outcome determination is that emergency egress is not acceptable.

7. The method of claim 6, wherein the emergency egress not acceptable function is the output of a warning.

8. The method of claim 2, wherein a vehicle saving function is performed if the preferred outcome determination is that the vehicle can be saved.

9. The method of claim 8, wherein the vehicle saving function is the output of a warning, or instructions to an operator or to a flight system.

10. The method of claim 1, wherein using an off-line process to create a neural network comprises:
    (a) obtaining a set of vehicle conditions;
    (b) simulating a vehicle systems operation;
    (c) making the preferred outcome determination for the set of vehicle conditions; and
    (d) storing the preferred outcome determination for the set of vehicle conditions.

11. The method of claim 10, further comprising performing (a)-(d) for a plurality of vehicle conditions.

12. A system for performing vehicle emergency and control functions, comprising:
    (a) a processing unit; and
    (b) a storage medium coupled to the processing unit, the storage medium storing program code implemented by the processing unit for:
        (i) using an off-line process to create a neural network comprising a plurality of preferred outcome decisions based on the state of the vehicle;

(ii) implementing the neural network as a controller; and (iii) using the controller during an on-line operation of the vehicle, to make a preferred outcome determination based on current state of the vehicle.

13. The system of claim 12, wherein the program code implemented by the processing unit further performs a function based on the preferred outcome determination.

14. The system of claim 13, wherein an emergency egress function is performed if the preferred outcome determination is that emergency egress is acceptable.

15. The system of claim 14, wherein the emergency egress function is automatic ejection from the vehicle.

16. The system of claim 14, wherein the emergency egress function is the output of a warning.

17. The system of claim 13, wherein an emergency egress not acceptable function is performed if the preferred outcome determination is that emergency egress is not acceptable.

18. The system of claim 17, wherein the emergency egress not acceptable function is the output of a warning.

19. The system of claim 13, wherein a vehicle saving function is performed if the preferred outcome determination is that the vehicle can be saved.

20. The system of claim 19, wherein the vehicle saving function is the output of a warning, or instruction to an operator or to a flight system.

21. The system of claim 12, wherein using an off-line process to create a neural network comprises:

(a) obtaining a set of vehicle conditions;

(b) simulating a vehicle systems operation;

(c) making the preferred outcome determination for the set of vehicle conditions; and (d) storing the preferred outcome determination for the set of vehicle conditions.

22. The system of claim 21, further comprising performing (a)–(d) for a plurality of vehicle conditions.

* * * * *

UNITED STATES PATENT AND TRADEMARK OFFICE
CERTIFICATE OF CORRECTION

PATENT NO. : 6,114,976
DATED : September 5, 2000
INVENTOR(S) : J.L. Vian

It is certified that error appears in the above-identified patent and that said Letters Patent is hereby corrected as shown below:

Column 6,
Line 27, (Claim 1, line 9) after "based on" insert -- the --

Column 8,
Line 5, (Claim 20, line 2), "instruction" should read -- instructions --

Signed and Sealed this

Twenty-third Day of October, 2001

Attest:

*Nicholas P. Godici*

NICHOLAS P. GODICI
*Acting Director of the United States Patent and Trademark Office*

*Attesting Officer*